(12) United States Patent
Buckert et al.

(10) Patent No.: US 8,465,043 B1
(45) Date of Patent: Jun. 18, 2013

(54) VEHICULAR COLLISION PROTECTION DEVICE

(76) Inventors: John Frederick Buckert, Sterling Heights, MI (US); Andrew Vaughan Balash, St. Clair Shores, MI (US); Alex Khakhalev, San Diego, CA (US)

( * ) Notice: Subject to any disclaimer, the term of this patent is extended or adjusted under 35 U.S.C. 154(b) by 126 days.

(21) Appl. No.: 13/199,194

(22) Filed: Aug. 22, 2011

(51) Int. Cl.
*B60D 1/00* (2006.01)

(52) U.S. Cl.
USPC .......................................................... 280/507

(58) Field of Classification Search
USPC ........................................ 280/507; D12/162
See application file for complete search history.

(56) References Cited

U.S. PATENT DOCUMENTS

| 5,603,178 A | * | 2/1997 | Morrison | 40/591 |
| 6,247,257 B1 | * | 6/2001 | Powell | 40/591 |
| D480,338 S | * | 10/2003 | Harwood | D12/162 |
| 6,908,097 B2 | * | 6/2005 | Roberts | 280/507 |
| D618,598 S | * | 6/2010 | Edwards | D12/162 |
| 2004/0017061 A1 | * | 1/2004 | Roberts | 280/507 |
| 2005/0121880 A1 | * | 6/2005 | Santangelo | 280/507 |

* cited by examiner

*Primary Examiner* — Tony Winner
(74) *Attorney, Agent, or Firm* — Buckert Patent & Trademark Law Firm, P.C.

(57) ABSTRACT

A vehicular collision protection device is provided. The device includes a plastic shaft having a first end portion and a second end portion and extending along a longitudinal axis. The first end portion is received in a vehicle hitch receiver. The plastic shaft has a plurality of apertures extending therethrough and are spaced apart from one another. At least one of the plurality of apertures receives a locking pin therethrough that removably couples the plastic shaft to the vehicle hitch receiver. The device further includes a plate member coupled to the second end portion of the plastic shaft.

17 Claims, 19 Drawing Sheets

| INJECTION MOLDING MACHINE INJECTION MOLDS A PLASTIC SHAFT HAVING A FIRST END PORTION AND A SECOND END PORTION AND EXTENDING ALONG A LONGITUDINAL AXIS, THE PLASTIC SHAFT HAVING A PLURALITY OF APERTURES THAT ARE SPACED APART FROM ONE ANOTHER, THE FIRST END PORTION OF THE PLASTIC SHAFT CONFIGURED TO BE RECEIVED IN A PORTION OF A VEHICLE HITCH RECEIVER, AT LEAST ONE OF THE PLURALITY OF APERTURES CONFIGURED TO RECEIVE A LOCKING PIN THERETHROUGH THAT REMOVABLY COUPLES THE PLASTIC SHAFT TO THE VEHICLE HITCH RECEIVER | — 600 |

↓

| INJECTION MOLDING MACHINE INJECTION MOLDS A PLATE MEMBER THAT IS INTEGRALLY FORMED WITH THE SECOND END PORTION OF THE PLASTIC SHAFT, SUCH THAT WHEN AN AMOUNT OF FORCE APPLIED TO THE PLATE MEMBER IN A DIRECTION ALIGNED WITH THE LONGITUDINAL AXIS IS GREATER THAN A THRESHOLD AMOUNT OF FORCE, A PORTION OF THE PLASTIC SHAFT BETWEEN AT LEAST TWO OF THE PLURALITY OF APERTURES IS CONFIGURED TO BE SHEARED BY THE LOCKING PIN TO ABSORB AT LEAST A PORTION OF THE AMOUNT OF FORCE, THE PLATE MEMBER HAVING A GROOVE THEREIN | — 602 |

FIG. 23

VEHICULAR COLLISION PROTECTION DEVICE

BACKGROUND

Vehicles have long utilized rear bumpers to protect the vehicles from rear collisions with other vehicles. The rear bumpers are typically designed to withstand a 2.5 miles-per-hour (MPH) collision with a like-sized vehicle with no structural damage to the vehicle. However, if a first vehicle is impacted by a second vehicle that has a greater weight than the first vehicle, the rear bumper of the first vehicle may not prevent structural damage to the first vehicle and/or injuries to the occupants of the first vehicle. Also, if the first vehicle is impacted by a second vehicle traveling faster than 2.5 MPH, the rear bumper of the first vehicle may not be able to prevent structural damage to the first vehicle and/or injuries to the occupants of the first vehicle. Also, the rear bumper of the first vehicle may not be able to decelerate the second vehicle at less than 0.25 G's which may be extremely uncomfortable to the occupants of the first and second vehicles.

The inventors herein have recognized a need for a vehicular collision protection device that minimizes and/or eliminates the above-mentioned deficiencies.

SUMMARY

A vehicular collision protection device for coupling to a vehicle hitch receiver in accordance with an exemplary embodiment is provided. The vehicular collision protection device includes a plastic shaft having a first end portion and a second end portion and extending along a longitudinal axis. The first end portion is configured to be received in a portion of the vehicle hitch receiver. The plastic shaft has a plurality of apertures extending therethrough that are spaced apart from one another. At least one of the plurality of apertures is configured to receive a locking pin therethrough that removably couples the plastic shaft to the vehicle hitch receiver. The vehicular collision protection device further includes a plate member coupled to the second end portion of the plastic shaft, such that when an amount of force applied to the plate member in a direction aligned with the longitudinal axis is greater than a threshold amount of force, a portion of the plastic shaft between at least two of the plurality of apertures is configured to be sheared by the locking pin to absorb at least a portion of the amount of force.

A method for manufacturing a vehicular collision protection device for coupling to a vehicle hitch receiver in accordance with another exemplary embodiment is provided. The method includes providing a plastic shaft having a first end portion and a second end portion and extending along a longitudinal axis. The first end portion of the plastic shaft is configured to be received in a portion of the vehicle hitch receiver. The method further includes machining a plurality of apertures in the plastic shaft and spaced apart from one another utilizing a machining device. At least one of the plurality of apertures is configured to receive a locking pin therethrough that removably couples the plastic shaft to the vehicle hitch receiver. The method further includes coupling a plate member to the second end portion of the plastic shaft utilizing a bolt, such that when an amount of force applied to the plate member in a direction aligned with the longitudinal axis is greater than a threshold amount of force, a portion of the plastic shaft between at least two of the plurality of apertures is configured to be sheared by the locking pin to absorb at least a portion of the amount of force.

A method for manufacturing a vehicular collision protection device for coupling to a vehicle hitch receiver in accordance with another exemplary embodiment is provided. The method includes injection molding a plastic shaft having a first end portion and a second end portion and extending along a longitudinal axis. The plastic shaft has a plurality of apertures that are spaced apart from one another. The first end portion of the plastic shaft is configured to be received in a portion of the vehicle hitch receiver. At least one of the plurality of apertures is configured to receive a locking pin therethrough that removably couples the plastic shaft to the vehicle hitch receiver. The method further includes coupling a plate member to the second end portion of the plastic shaft utilizing a bolt, such that when an amount of force applied to the plate member in a direction aligned with the longitudinal axis is greater than a threshold amount of force, a portion of the plastic shaft between at least two of the plurality of apertures is configured to be sheared by the locking pin to absorb at least a portion of the amount of force.

A method for manufacturing a vehicular collision protection device for coupling to a vehicle hitch receiver in accordance with another exemplary embodiment is provided. The method includes injection molding a plastic shaft having a first end portion and a second end portion and extending along a longitudinal axis utilizing an injection molding machine. The plastic shaft has a plurality of apertures that are spaced apart from one another. The first end portion of the plastic shaft is configured to be received in a portion of the vehicle hitch receiver. At least one of the plurality of apertures is configured to receive a locking pin therethrough that removably couples the plastic shaft to the vehicle hitch receiver. The method further includes injection molding a plate member that is integrally formed with the second end portion of the plastic shaft utilizing the injection molding machine, such that when an amount of force applied to the plate member in a direction aligned with the longitudinal axis is greater than a threshold amount of force, a portion of the plastic shaft between at least two of the plurality of apertures is configured to be sheared by the locking pin to absorb at least a portion of the amount of force.

BRIEF DESCRIPTION OF THE DRAWINGS

FIG. 23 is a flowchart of a method for manufacturing the vehicular collision protection device of FIG. 21 utilizing the system of FIG. 22.

DETAILED DESCRIPTION

Figure 1:
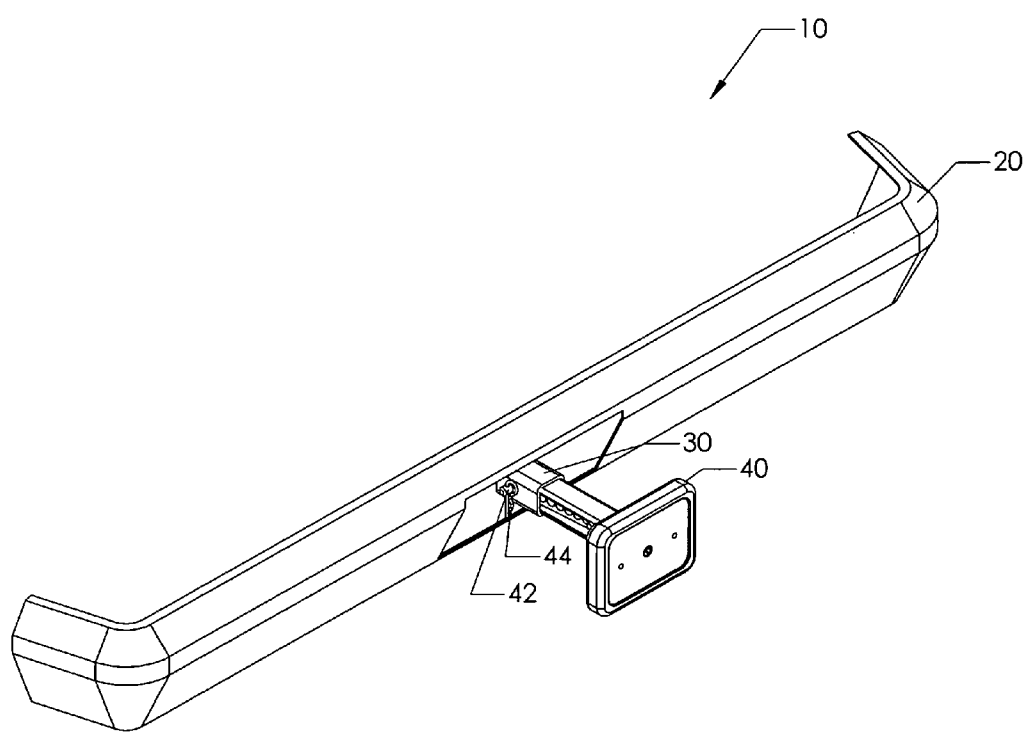
FIG. 1 is a schematic of a vehicle having a rear bumper, a vehicle hitch receiver; and a vehicular collision protection device in accordance with an exemplary embodiment.

Referring to FIG. 1, a vehicle 10 is illustrated. The vehicle 10 includes a rear bumper 20, a vehicle hitch receiver 30; a vehicular collision protection device 40 in accordance with an exemplary embodiment, a locking pin 42, and a clip 44. An advantage of the vehicular collision protection device 40 is that when an amount of force applied to the device 40 in a direction aligned with a longitudinal axis of the device 40 is greater than a threshold amount of force, a portion of a plastic shaft 80 of the device 40 between at least two of a plurality of apertures is configured to be sheared by the locking pin 42 to absorb at least a portion of the amount of force.

Referring to FIGS. 1-4, the rear bumper 20 and the vehicle hitch receiver 30 are coupled to a vehicle frame (not shown) as known to those skilled in the art. The vehicle hitch receiver 30 includes a rectangular tubular-shaped body 60 and an aperture 62 extending through two side walls of the body 60. The aperture 62 is configured to receive the locking pin 42 therein.

The vehicular collision protection device 40 is provided to absorb at least a portion of an amount of force applied to the device 40 by another vehicle 93 colliding or impacting with the vehicle 10. The vehicular collision protection device 40 includes a plastic shaft 80, a plate member 90, and a bolt 92. The plate member 90 is coupled to the plastic shaft 80 utilizing the bolt 92. In the illustrated embodiment, the plastic shaft 80 is constructed of an ultra high molecular weight polyethylene. Of course, in alternative embodiments, the plastic shaft 80 could be constructed of other plastics having the desired force absorption characteristics.

Referring to FIGS. 1 and 4-6, the plastic shaft 80 has a first end portion 100 and a second end portion 102. The plastic shaft 80 extends along a longitudinal axis 81. The first end portion 100 is configured to be received in a portion of the vehicle hitch receiver 30. The plastic shaft 80 further includes a plurality of apertures 130, 132, 134, 136, 138, 140, 142, 144, 146 extending therethrough and spaced apart from one another. At least one of the plurality of apertures 130-146 are configured to receive the locking pin 42 therethrough that removably couples the plastic shaft 80 to the vehicle hitch receiver 30.

The plastic shaft 80 further includes a first side 110, a second side 112, a third side 114, and a fourth side 116. The second side 112 is disposed opposite to the first side 110 and is generally parallel to the first side 110. The plurality of apertures 130-146 extend between the first side 110 and the second side 112 and are spaced apart from one another. The fourth side 116 is disposed opposite to the third side 114 and is generally parallel to the third side 114. The fourth side 116 is generally perpendicular to the first side 110.

The first side 110 of the plastic shaft 80 has a first groove 150 extending into the first side 110 that further extends along a first region encompassing ends of the plurality of apertures 130-146 that are proximate to the first side 110. A height of the first groove 150 in a direction extending from the third side 114 toward the fourth side 116 is greater than a diameter of each of the plurality of apertures 130-146. A depth of the first groove 150 increases along a direction from the first end portion 100 toward the second end portion 102. In particular, a first depth of the first groove 150 proximate to the aperture 130 that is proximate to the first end portion 100 is less than a second depth of the first groove 150 proximate to the aperture 146 that is proximate to the second end portion 102. An advantage of having the depth of the first groove 150 increase along the longitudinal axis 81 is that sheared portions of the plastic shaft 80 can be accommodated in the groove 150 as the locking pin 42 shears through the plastic shaft 80 such that the sheered portions do not form a wedge between an outer surface of the plastic shaft 80 and the vehicle hitch receiver 30 that would inhibit movement of the plastic shaft 80 into the receiver 30 when a vehicle 93 impacts the device 40.

The second side 112 of the plastic shaft 80 has a second groove 152 extending into the second side 112 that further extends along a second region encompassing ends of the plurality of apertures 130-146 that are proximate to the second side 112. A height of the second groove 152 in a direction extending from the third side 114 toward the fourth side 116 is greater than a diameter of each of the plurality of apertures 130-146. A depth of the second groove 152 increases along a direction from the first end portion 100 toward the second end portion 102. In particular, a first depth of the second groove 152 proximate to the aperture 130 that is proximate to the first end portion 100 is less than a second depth of the second groove 152 proximate to the aperture 146 that is proximate to the second end portion 102. An advantage of having the depth of the second groove 152 increase along the longitudinal axis 81 is that sheared portions of the plastic shaft 80 can be accommodated in the groove 152 as the locking pin 42 shears through the plastic shaft 80 such that the sheered portions do not form a wedge between an outer surface of the plastic shaft 80 and the vehicle hitch receiver 30 that would inhibit movement of the plastic shaft 80 into the receiver 30 when a vehicle 93 impacts the device 40.

In an exemplary embodiment, the plastic shaft 80 has a generally rectangular cross-sectional profile and a distance from the first side 110 to the second side 112 of the plastic shaft 80 is in a range of 1.8 inches to 2.2 inches. For example, in the illustrated embodiment, the distance from the first side 110 to the second side 112 of the plastic shaft 80 can be substantially 2.0 inches. Also, a distance from the third side 114 to the fourth side 116 of the plastic shaft 80 is in a range of 1.8 inches to 2.2 inches. For example, in the illustrated embodiment, the distance from the third side 114 to the fourth side 116 of the plastic shaft 80 is substantially 2.0 inches.

Of course, in an alternative embodiment, the distance between the first side 110 and the second side 112 of the plastic shaft 80 could be in a range of 0.8 inches to 1.2 inches. In particular, the distance between the first side 110 and the second side 112 of the plastic shaft 80 could be substantially 1.0 inch. Also, the distance between the third side 114 and the fourth side 116 of the plastic shaft 80 could be in a range of 0.8 inches to 1.2 inches. In particular, the distance between the third side 114 and the fourth side 116 of the plastic shaft 80 could be substantially 1.0 inch.

Further, in an exemplary embodiment, a diameter of each of the plurality of apertures 130-146 is in a range of 0.6-0.65 inches. Also, a distance between each of the apertures 130-146 is in a range of 0.1-0.2 inches. For example, in the illustrated embodiment, a distance between closest edges of each adjacent aperture of the apertures 130-136 is substantially 0.12 inches. Also, a length of each of the plurality of apertures is in a range of 0.6-1.5 inches. For example, in the illustrated embodiment, the length of the aperture 130 is 1.5 inches and the length of the aperture 146 is 0.6 inches.

Further, referring to FIGS. 7, 8, 10 and 11 in the illustrated embodiment, the plastic shaft 80 has portions 160, 162, 164, 166, 168, 170, 172, 174 defined by the apertures 130-146. For example, the portion 160 is disposed between the apertures 130, 132, and the portion 162 is disposed between the apertures 132, 134. Further, the portion 164 is disposed between the apertures 134, 136, and the portion 166 is disposed between the apertures 136, 138. Further, the portion 168 is disposed between the apertures 138, 140, and the portion 170 is disposed between the apertures 140, 142. Further, the portion 172 is disposed between the apertures 142, 144, and the portion 174 is disposed between the apertures 144, 146. A width W of each of the portions 160, 162, 164, 166, 168, 170, 172, 174 is in a range of 0.1-0.2 inches. For example, in the illustrated embodiment, the width W is substantially 0.12 inches. Of course, in an alternative embodiment, the width W could be varied depending on desired force absorption characteristics of the plastic shaft 80.

The plastic shaft 80 further includes an aperture 170 extending into the end portion 102 that defines internal threads for threadably receiving the threaded end 270 of the bolt 92 therein.

It should be further noted that in an alternative embodiment, the apertures 130-146 could be replaced with a number of apertures less than or greater than nine apertures. Further, in an alternative embodiment, a diameter of one or more of the apertures 130-146 could be varied based upon desired force absorption characteristics of the plastic shaft 80. Still further, in an alternative embodiment, the width between one or more apertures 130-146 could be varied depending on desired force absorption characteristics of the plastic shaft 80.

Figure 2:
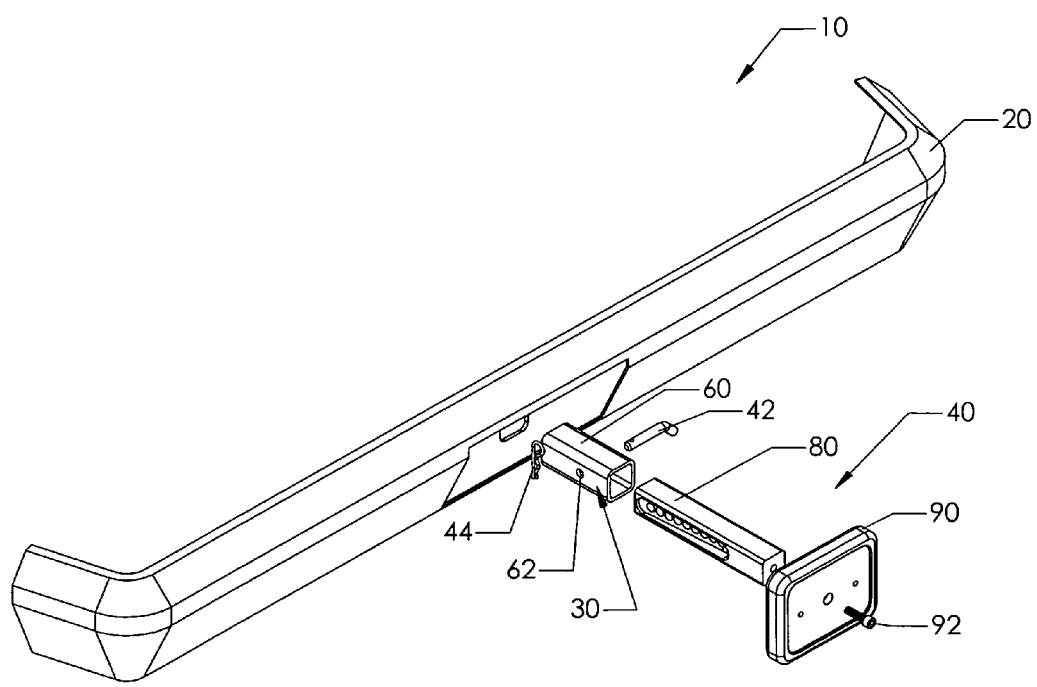
FIG. 2 is another schematic of the vehicle of FIG. 1 having an exploded view of the vehicle hitch receiver and the vehicular collision protection device
Figure 3:
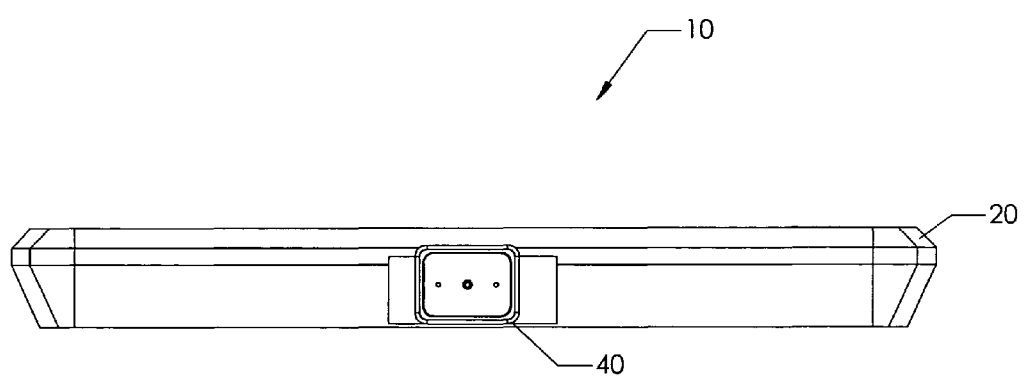
FIG. 3 is a rear view of the vehicle of FIG. 1.
Figure 4:
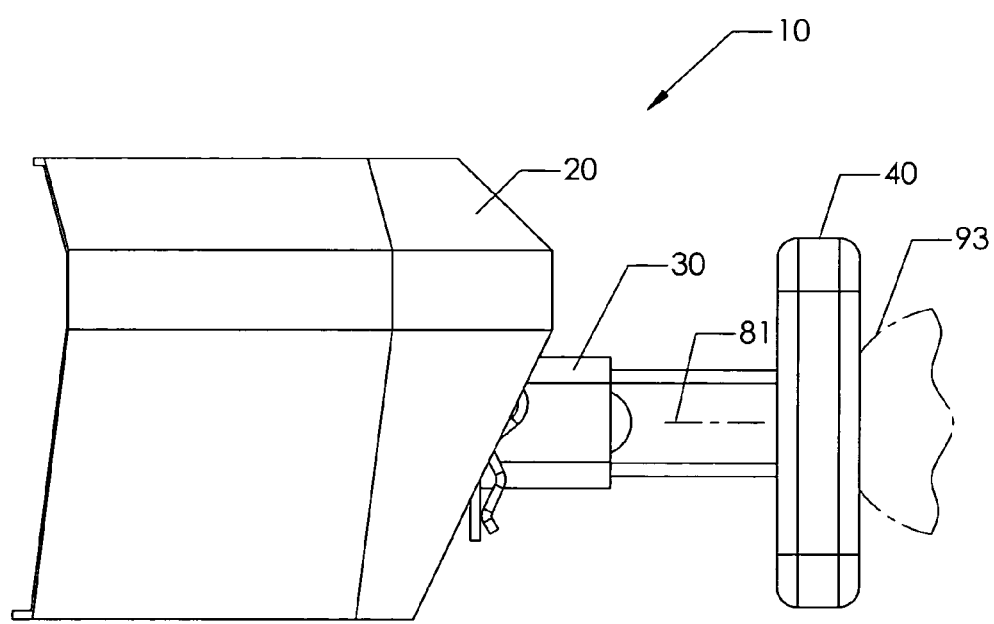
FIG. 4 is a side view of the vehicle of FIG. 1 having a vehicular collision protection device that has absorbed an impact force from another vehicle.
Figure 5:
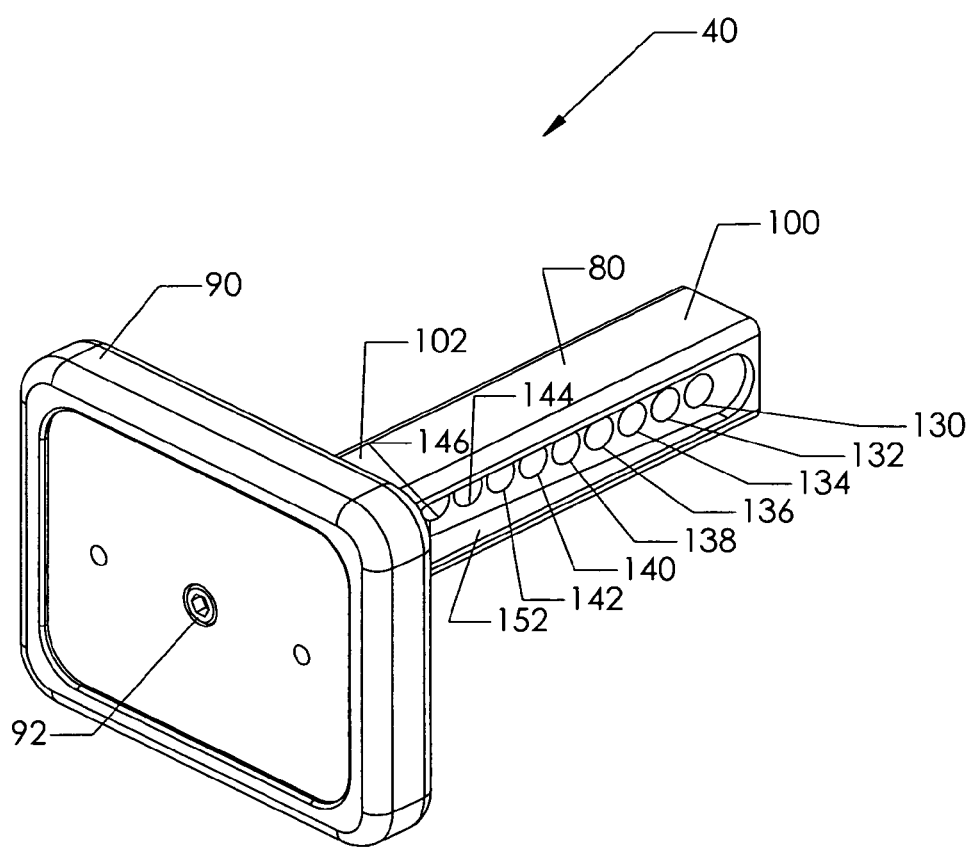
FIG. 5 is a schematic of the vehicular collision protection device in accordance with an exemplary embodiment.
Figure 6:
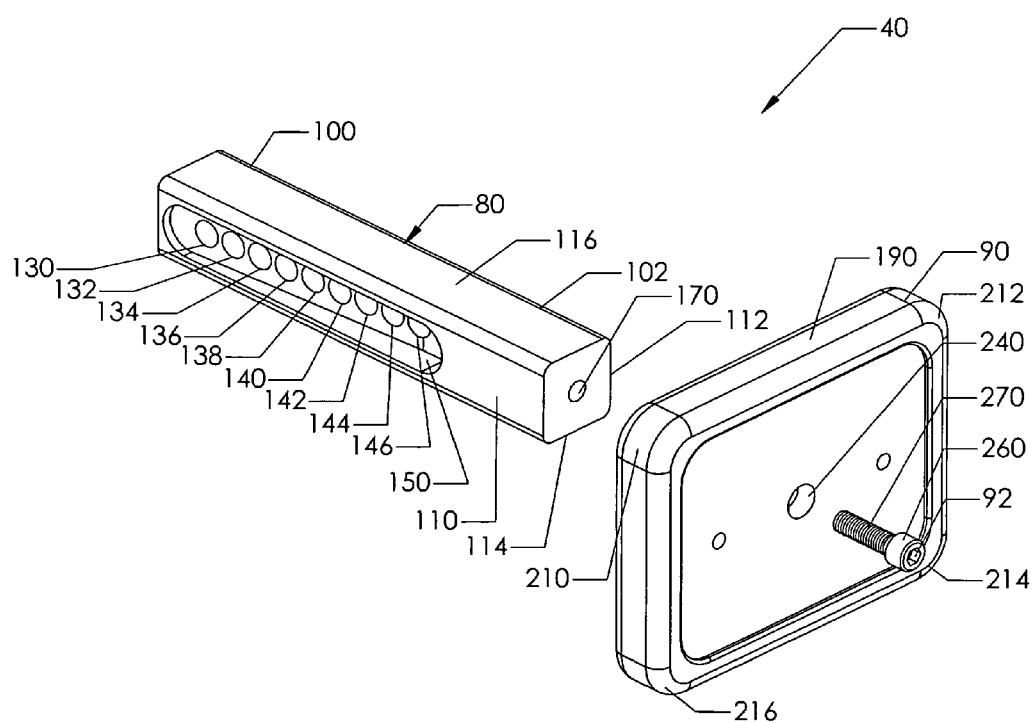
FIG. 6 is an exploded view of the vehicular collision protection device of FIG. 5.
Figure 7:
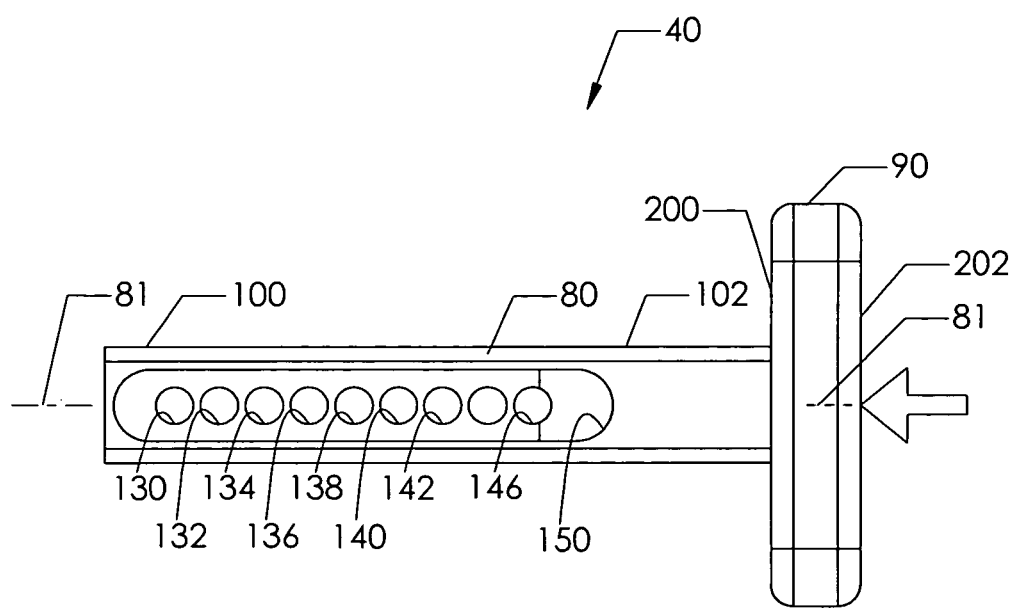
FIG. 7 is a side view of the vehicular collision protection device of FIG. 5.
Figure 8:
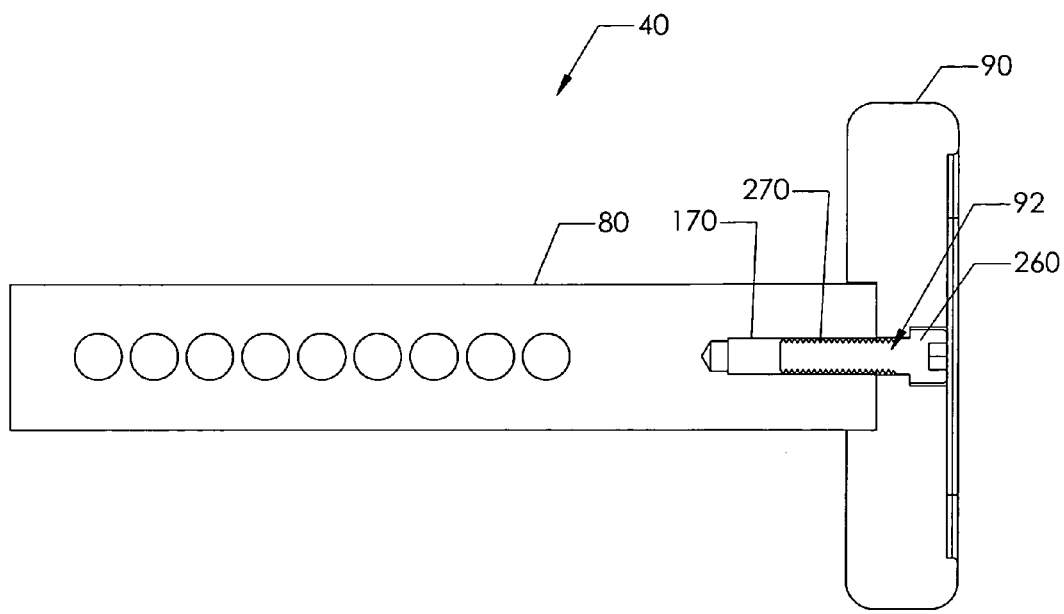
FIG. 8 is a cross-sectional view of the vehicular collision protection device of FIG. 7.
Figure 9:
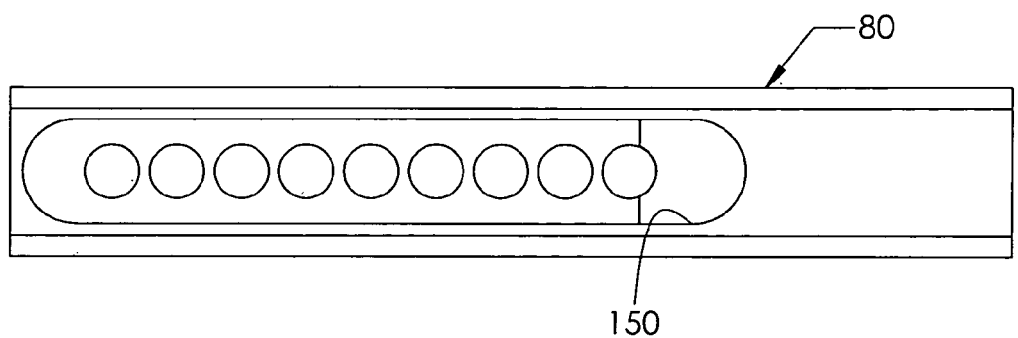
FIG. 9 is a side view of a plastic shaft utilized in the vehicular collision protection device of FIG. 7.
Figure 10:
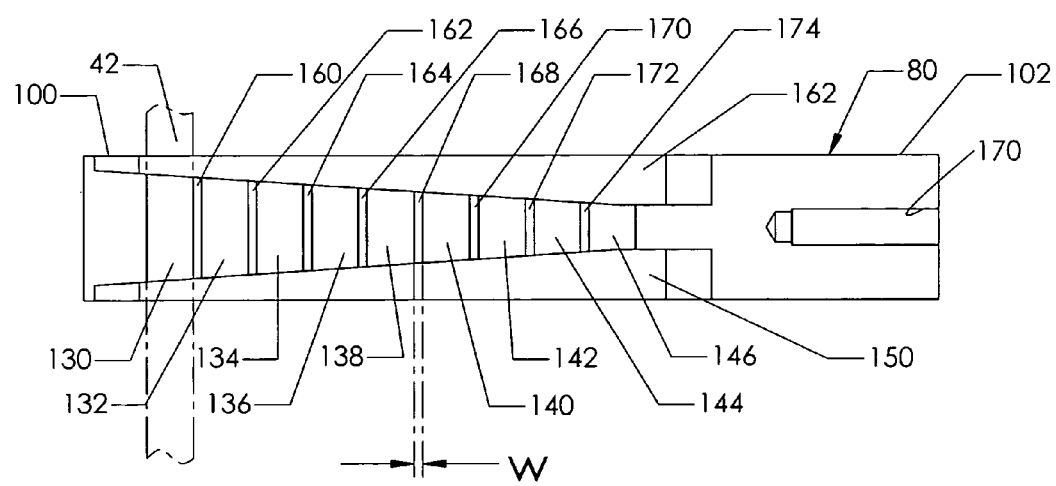
FIG. 10 is a cross-sectional view of the vehicular collision protection device of FIG. 9.
Figure 11:
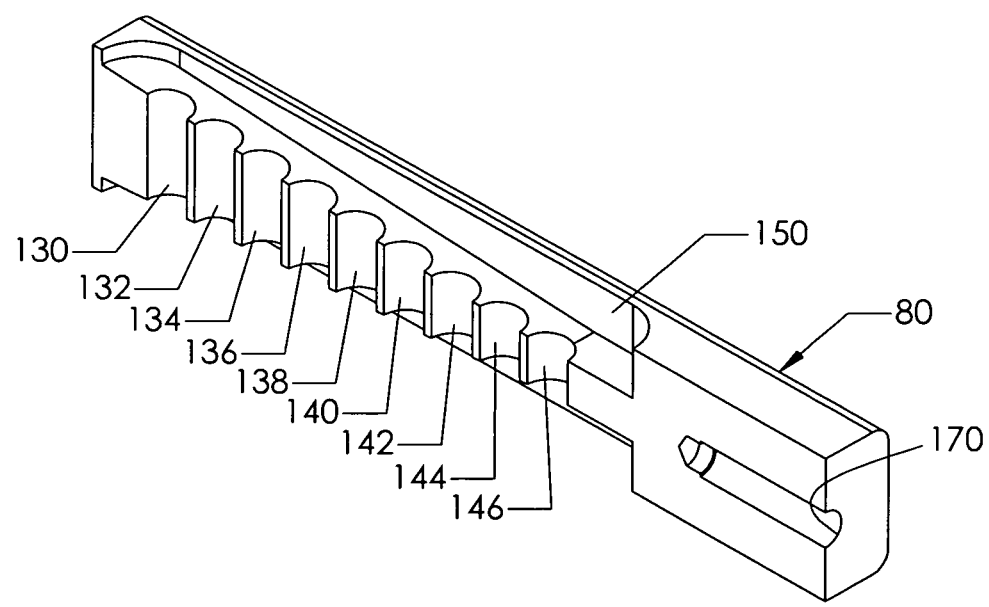
FIG. 11 is another cross-sectional view of the vehicular collision protection device of FIG. 9.
Figure 12:
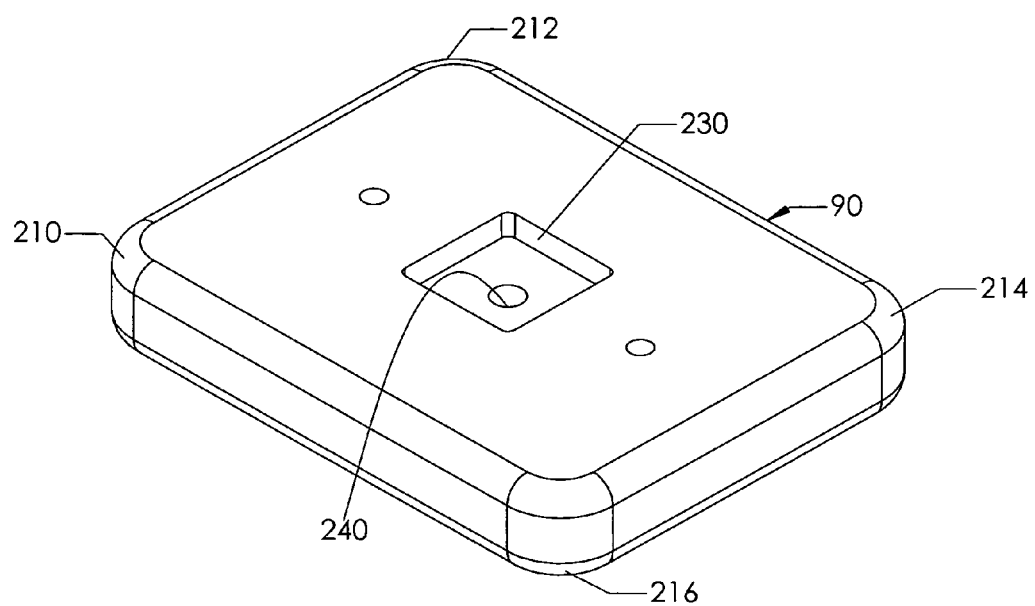
FIG. 12 is a schematic of a plate member utilized in the vehicular collision protection device of FIG. 5.
Figure 13:
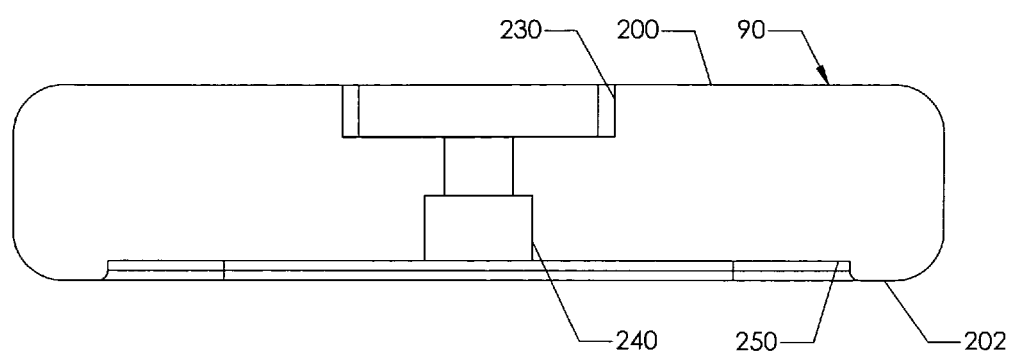
FIG. 13 is a cross-sectional schematic of the plate member of FIG. 12.

Referring to FIGS. 2, 4 and 10, a general explanation of the operation of the plastic shaft 80 to absorb an impact force will now be described. Initially, the locking pin 42 is assumed to be disposed within the aperture 130 of the plastic shaft 80 and further through the aperture 62 of the vehicle hitch receiver 30 for coupling the vehicular collision protection device 40 to the receiver 30. When another vehicle 93 applies an amount of force to the plate member 90 in a direction aligned with the longitudinal axis 81 that is greater than a threshold amount of force, at least one of the portions 160-174 are sheared by the locking pin 42 to absorb at least a portion of the amount of force. For example, the portions 160-172 could be sequentially sheared based on the amount of force applied to the plate member 90 along the longitudinal axis 81, to absorb at least a portion of the amount of force.

In the illustrated embodiment, the plastic shaft 80 is configured to absorb an amount of force applied to the plate member 90 along the longitudinal axis 81 by a vehicle 93 having a weight of 6500 pounds and contacting the plate member 90 at 5 MPH. Further, the plastic shaft is configured to decelerate the vehicle 93 at less than 0.2 Gs to a speed of 0 MPH to safely stop the vehicle 93 without injuring the occupants of the vehicle 93 or the vehicle 10 due to extreme G forces.

Referring to FIGS. 7, 8, 12 and 13, the plate member 90 is configured to be coupled to the end portion 102 of the plastic shaft 80. In an exemplary embodiment, the plate member 90 includes a body 190 having a generally rectangular shape. The body 190 includes a first side 200 and a second side 202. The body 190 further includes rounded corners 210, 212, 214, 216. A generally rectangular-shaped groove 230 extends into the first side 200 and is configured to receive at least a portion of the end portion 102 of the plastic shaft 80 therein. The groove 230 is provided to prevent rotation of the plate member 90 relative to the plastic shaft 80. The body 190 further includes an aperture 240 extending therethrough that is disposed within the groove 230. The bolt 92 includes a head portion 260 and a threaded end 270. The threaded end 270 of the bold 92 is disposed through the aperture 240 in the plate member 90 and is threadably coupled in the aperture 170 to the plastic shaft 80. The plate member 90 further includes a generally rectangular-shaped groove 250 that extends into the second side 202. In the illustrated embodiment, the plate member 90 is constructed of an ultra high molecular weight polyethylene. Of course, in an alternative embodiment, the plate member 90 could be constructed of other materials such as steel or stainless steel for example. Also, in an alternative embodiment, the plate member 90 could have alternate shapes. For example, the plate member 90 could alternatively be a tubular-shaped member (e.g., a tubular-shaped plate) having an exterior wall coupled to the plastic shaft 80, or be a generally arcuate-shaped plate.

Referring to FIGS. 1 and 2, the metal clip 44 is configured to clip onto an end portion of the locking pin 42 to maintain an operational position of the locking pin 42 in both the vehicle hitch receiver 30 and the plastic shaft 80. In particular, after the locking pin 42 is disposed through the aperture 62 of the vehicle hitch receiver 30 and the aperture 130 of the plastic shaft 80, the metal clip 44 is applied to the end portion of the locking pin 42. It should be noted that the locking pin 42 could be disposed in any of the apertures 130-144 of the plastic shaft 80. However, for a maximum absorption of force by the plastic shaft 80, the locking pin 42 would be disposed in the aperture 130.

Figure 14:
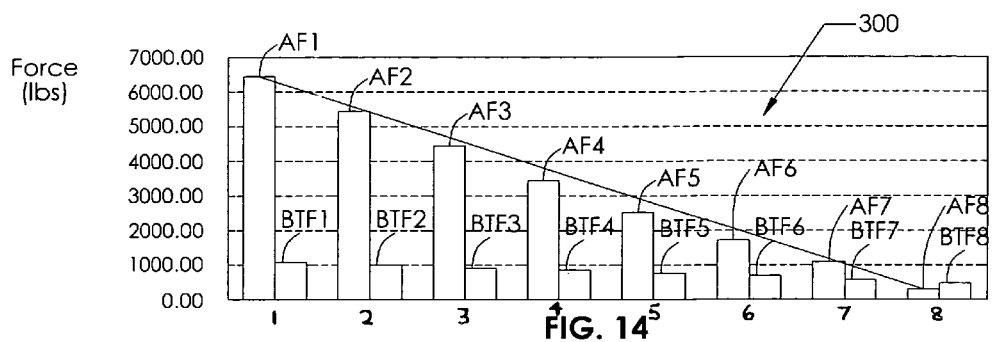
FIG. 14 is a graph indicating applied forces by a vehicle impacting the vehicular collision protection device of FIG. 5.

Referring to FIG. 14, an explanation of operational characteristics of the vehicular collision protection device 40 when the vehicle 93 (shown in FIG. 4) having a weight of 6500 pounds and traveling at 5 MPH applies a force to the device 40 along the longitudinal axis 81 will now be provided. The graph 300 has a Y-axis corresponding to applied forces in pounds applied to the vehicular collision protection device 40 along the longitudinal axis 81 by the vehicle 93. The graph 300 also has an X-axis corresponding to the positions of the apertures 130, 132, 134, 136, 138, 140, 142, 144 along the plastic shaft 80. In particular, the X-axis designations 1, 2, 3, 4, 5, 6, 7, 8 correspond to the positions of the apertures 130, 132, 134, 136, 138, 140, 142, 144, respectively, along the plastic shaft 80. Further, the designation AF corresponds to an applied longitudinal forces by the locking pin 42 at the apertures 130, 132, 134, 136, 138, 140, 142, 144 to the adjacent portions 160, 162, 164, 166, 168, 170, 172, 174, respectively. Also, BTF corresponds to a longitudinal breakthrough force required to shear one of the respective portions 160-174 utilizing the locking pin 42 as the plastic shaft 80 is pushed longitudinally inwardly into the vehicle hitch receiver 30 by an applied force. For example, when another vehicle 93 impacts the device 40 and applies 6500 lbs of force to the device 40 along the longitudinal axis 81, AF1 corresponds to an applied force of 6500 pounds on the locking pin 42 in the aperture 130 that is applied to the portion 160 of the plastic shaft 80. Also, BTF1 corresponds to a breakthrough force of 1257 pounds required to shear the portion 160 by the locking pin 42. As shown by the graph 300, the magnitude of applied force AF1 on the portion 160 is greater than the magnitude of the breakthrough force BTF1 of the portion 160, so that the locking pin 42 would shear the portion 160. Similarly, the locking pin 42 would shear the portions 162, 164, 166, 168, 170, 172 that are adjacent the apertures 132, 134, 136, 138, 140, 142, respectively, corresponding to positions 2, 3, 4, 5, 6, 7, respectively, on the X-axis. By shearing of the portions 160-172 utilizing the locking pin 42 as the plastic shaft 80 is pushed inwardly into the vehicle hitch receiver 30 by an applied force of the vehicle 93 to the device 40, the plastic shaft 80 absorbs the applied force applied by the vehicle 93 to the plastic shaft 80 and decelerates the vehicle 93. Referring to X-axis designation 8 corresponding to the aperture 144, since the magnitude of the applied force AF8 by the locking pin 42 at the aperture 144 to the portion 174 of the plastic shaft 80 is less than the magnitude of breakthrough force BTF8 on the portion 174, the locking pin 42 would not shear the portion 174 and the vehicle 93 would have a velocity of 0 MPH at this position.

Figure 15:
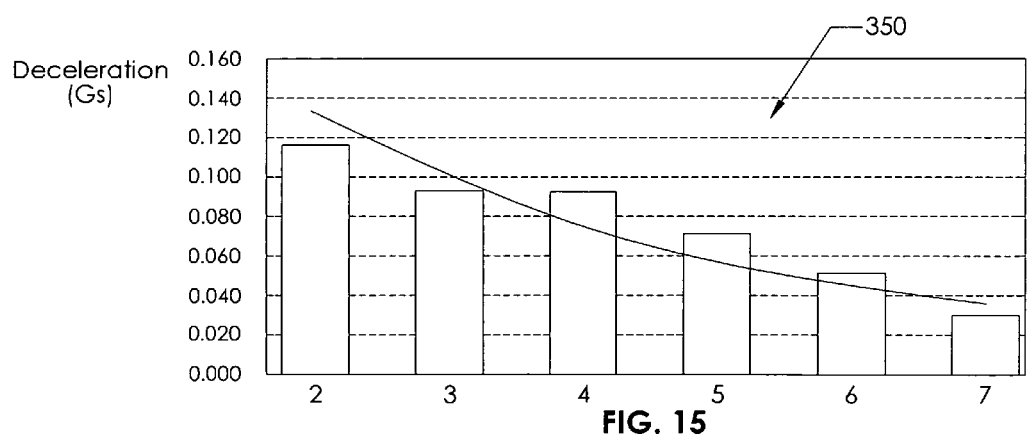
FIG. 15 is a graph indicating the deceleration characteristics of a vehicle impacting the vehicular collision protection device of FIG. 5.

Referring to FIG. 15, an explanation other operational characteristics of the vehicular collision protection device 40 when the vehicle 93 (shown in FIG. 4) having a weight of 6500 pounds and traveling at 5 MPH applies a force to the device 40 along the longitudinal axis 81. The graph 350 has a Y-axis corresponding to a deceleration of the vehicle 93 by the vehicular collision protection device 40. The graph 350 also has an X-axis corresponding to the portions 160-174 along the plastic shaft 80 that can be sheared. In particular, the X-axis designations 2, 3, 4, 5, 6, 7 correspond to the positions of the apertures 132, 134, 136, 138, 140, 142, respectively, along the plastic shaft 80. As shown, the vehicle 93 could be decelerated at less than 0.2 Gs.

It should be noted that 0.2 G's also corresponds to an amount of force applied by vehicle brakes on a vehicle occupant during a moderate braking condition when the vehicle wheels are not locked up by the brakes. In other words, an advantage of the vehicular collision protection device 40 is that the device 40 can decelerate the vehicle 93 having a weight of 6500 lbs and traveling 5 MPH without uncomfortable G forces being applied to the occupants of the vehicle 93.

Figure 16:
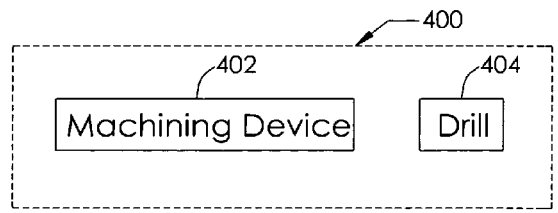
FIG. 16 is a block diagram of a system for manufacturing the vehicular collision protection device of FIG. 5.

Referring to FIG. 16, a block diagram of a system 400 for manufacturing the vehicular collision protection device 40 is illustrated. The system 400 includes a machining device 402 and a drill 404. In one exemplary embodiment, the machining device 402 comprises a computer numerically controlled (CNC) machine.

Figure 17:
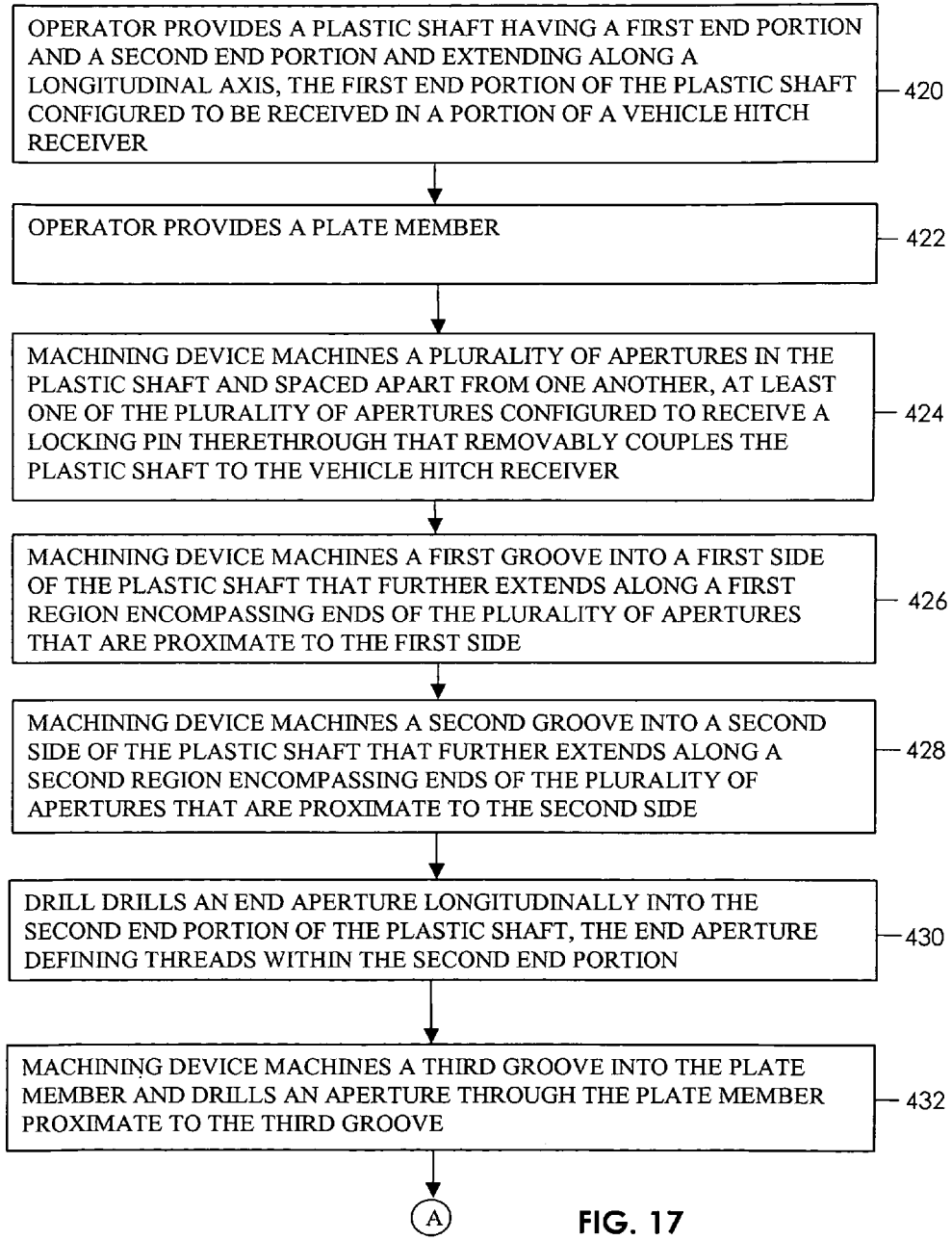
FIGS. 17 and 18 are flowcharts of a method for manufacturing the vehicular collision protection device of FIG. 5 utilizing the system of FIG. 16.
Figure 18:
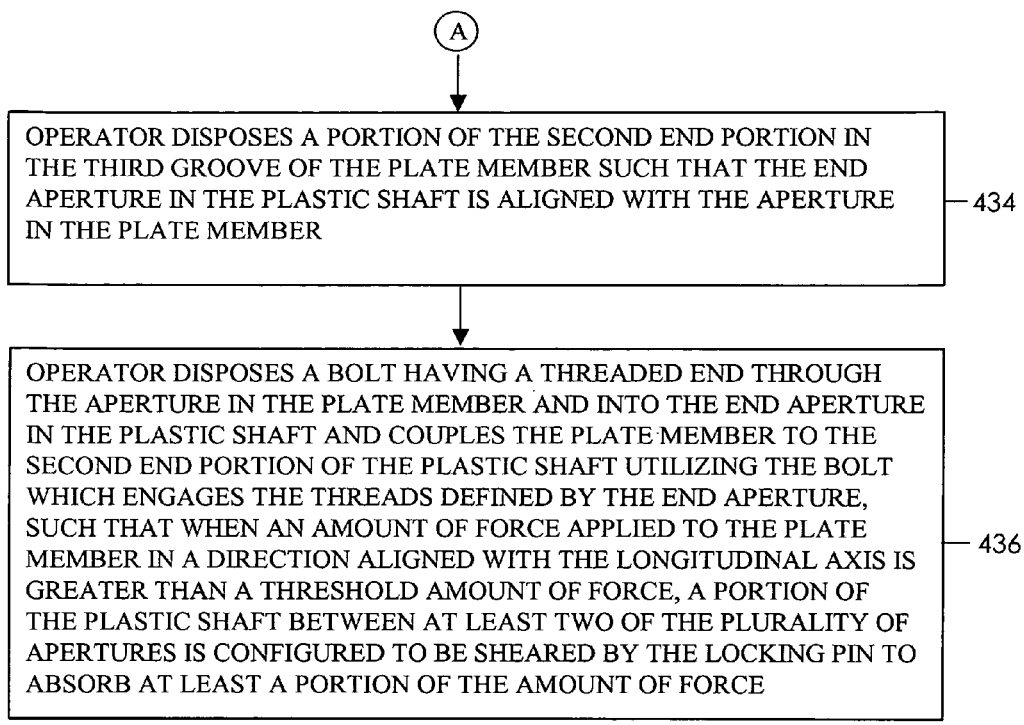

Referring to FIGS. 17 and 18, a flowchart of a method for manufacturing the vehicular collision protection device 40 utilizing the system 400 in accordance with another exemplary embodiment will now be explained.

At step 420, an operator provides the plastic shaft 80 having the first end portion 100 and the second end portion 102 and extending along the longitudinal axis 81. The first end portion 100 of the plastic shaft 80 is configured to be received in a portion of a vehicle hitch receiver 30.

At step 422, the operator provides the plate member 90.

At step 424, the machining device 402 machines a plurality of apertures 130-146 in the plastic shaft 80 and spaced apart from one another. At least one of the plurality of apertures 130-146 is configured to receive the locking pin 42 therethrough that removably couples the plastic shaft 80 to the vehicle hitch receiver 30.

At step 426, the machining device 402 machines the first groove 150 into the first side 110 of the plastic shaft 80 that further extends along a first region encompassing ends of the plurality of apertures 130-146 that are proximate to the first side 110.

At step 428, the machining device 402 machines in the second groove 152 into the second side 112 of the plastic shaft 80 that further extends along a second region encompassing ends of the plurality of apertures 130-146 that are proximate to the second side 112.

At step 430, the drill 404 drills an end aperture 170 longitudinally into the second end portion 102 of the plastic shaft 80. The end aperture 170 defines threads within the second end portion 102.

At step 432, the machining device 402 machines a third groove 230 into the plate member 90 and drills an aperture 240 through the plate member 90 proximate to the third groove 230.

At step 434, the operator disposes a portion of the second end portion 102 in the third groove 250 of the plate member 90 such that the end aperture 170 in the plastic shaft 80 is aligned with the aperture in the plate member 90.

At step 436, the operator disposes the bolt 92 having the threaded end 270 through the aperture 240 in the plate member 90 and into the end aperture 170 in the plastic shaft 80 and couples the plate member 90 to the second end portion 102 of the plastic shaft 80 utilizing the bolt 92 which engages the threads defined by the end aperture 170, such that when an amount of force applied to the plate member 90 in a direction aligned with the longitudinal axis 81 is greater than a threshold amount of force, a portion of the plastic shaft 80 between at least two of the plurality of apertures 130-146 is configured to be sheared by the locking pin 42 to absorb at least a portion of the amount of force.

Figure 19:
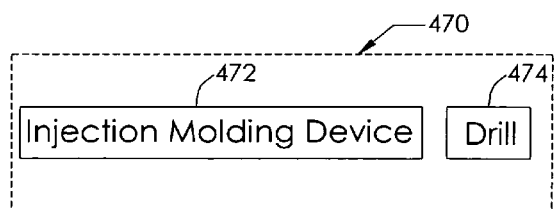
FIG. 19 is a block diagram of another system for manufacturing the vehicular collision protection device of FIG. 5.

Referring to FIG. 19, a block diagram of another system 470 for manufacturing the vehicular collision protection device 40 is illustrated. The system 470 includes an injection molding device 472 and a drill 404.

Figure 20:
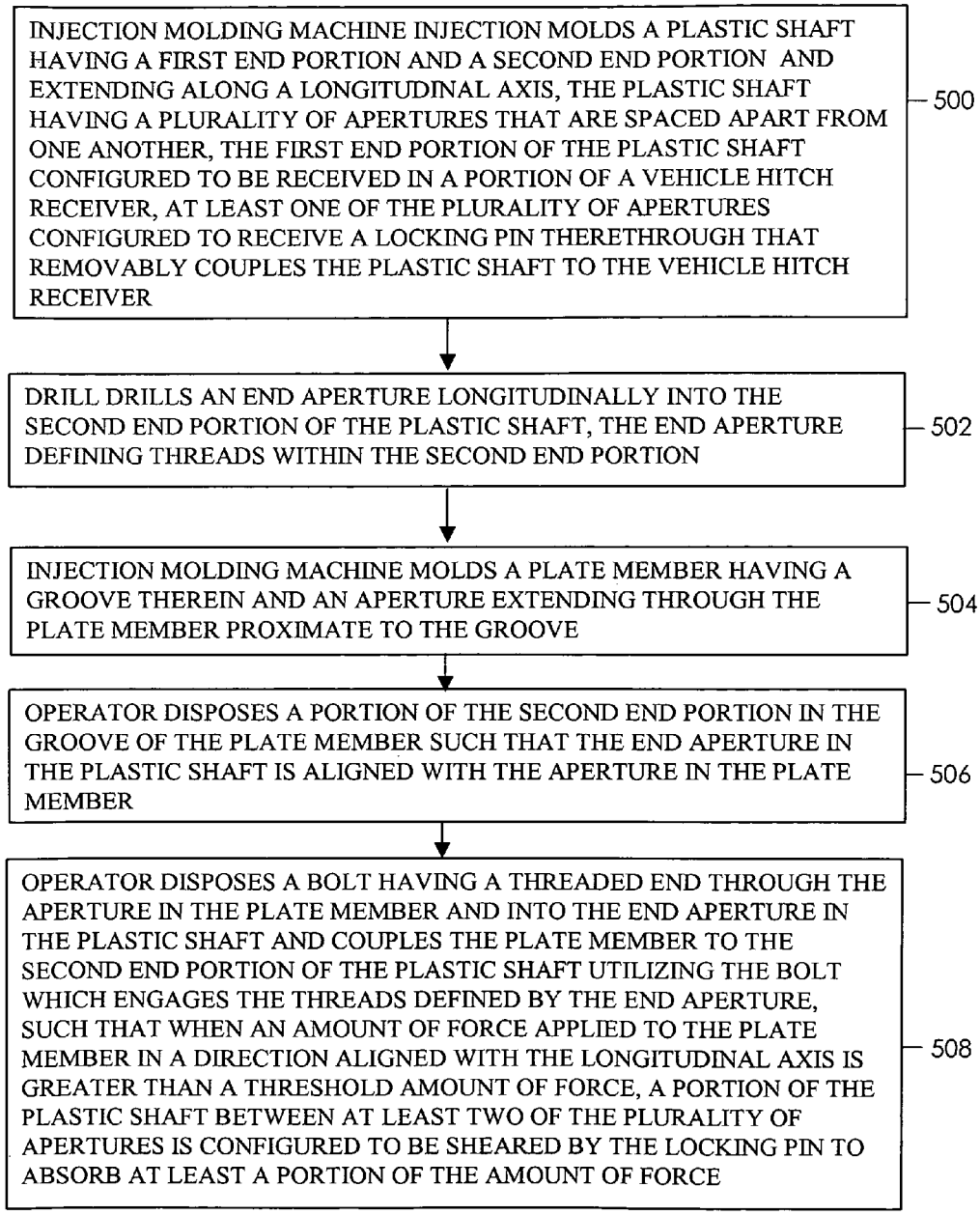
FIG. 20 is a flowchart of a method for manufacturing the vehicular collision protection device of FIG. 5 utilizing the system of FIG. 19.

Referring to FIG. 20, a flowchart of a method for manufacturing the vehicular collision protection device 40 utilizing the system 470 in accordance with another exemplary embodiment will now be explained.

At step 500, the injection molding machine 472 injection molds the plastic shaft 80 having the first end portion 100 and the second end portion 102 and extending along the longitudinal axis 81. The plastic shaft 80 has a plurality of apertures 130-146 that are spaced apart from one another. The first end portion 100 of the plastic shaft 80 is configured to be received in a portion of the vehicle hitch receiver 30. At least one of the plurality of apertures 130-146 is configured to receive the locking pin 42 therethrough that removably couples the plastic shaft 80 to the vehicle hitch receiver 30.

At step 502, the drill 474 drills the end aperture 170 longitudinally into the second end portion 102 of the plastic shaft 80. The end aperture 170 defines threads within the second end portion 102.

At step 504, the injection molding machine 472 injection molds the plate member 90 having the groove 230 therein and the aperture 240 extending through the plate member 90 proximate to the groove 230.

At step 506, the operator disposes a portion of the second end portion 102 in the groove 240 of the plate member 90 such that the end aperture 170 in the plastic shaft 80 is aligned with the aperture in the plate member 90.

At step 508, the operator disposes the bolt 92 having the threaded end 270 through the aperture 240 in the plate member 90 and into the end aperture 170 in the plastic shaft 80 and couples the plate member 90 to the second end portion 102 of the plastic shaft 80 utilizing the bolt 92 which engages the threads defined by the end aperture 170, such that when an amount of force applied to the plate member 90 in a direction aligned with the longitudinal axis 81 is greater than a threshold amount of force, a portion of the plastic shaft 80 between at least two of the plurality of apertures 130-146 is configured to be sheared by the locking pin 42 to absorb at least a portion of the amount of force.

Figure 21:
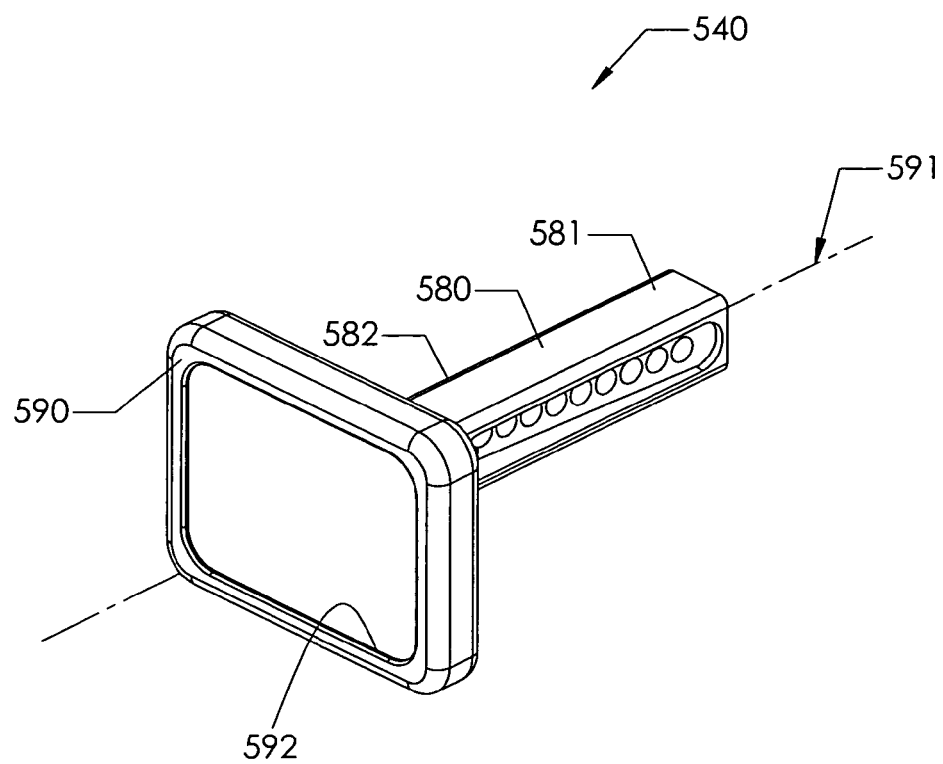
FIG. 21 is a schematic of another vehicular collision protection device in accordance with another exemplary embodiment.
Figure 22:
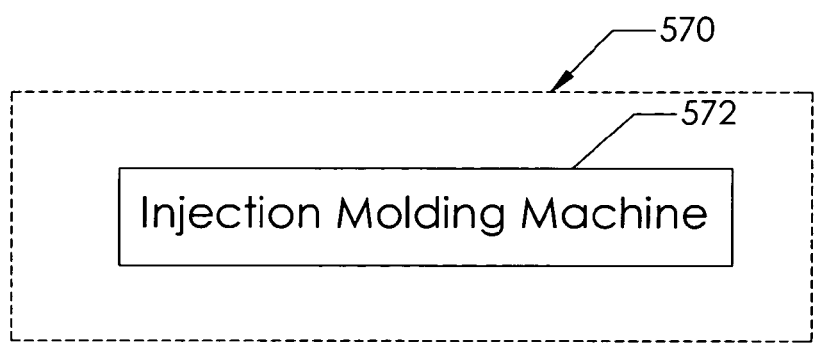
FIG. 22 is a block diagram of a system for manufacturing the vehicular collision protection device of FIG. 21.

Referring to FIGS. 21 and 22, a vehicular collision protection device 540 in accordance with another exemplary embodiment is provided. The vehicular collision protection device 540 includes a plastic shaft 580 and a plate member 590 integrally formed with the plastic shaft 580 and integrally coupled to the plastic shaft 580. The plastic shaft 580 has a similar structure as the plastic shaft 80 except that the shaft 580 does not have an end aperture for receiving a bolt therein. The plate member 590 has a similar structure as the plate member 90 except that the plate member 590 does not have an aperture for receiving a bolt therein. In one exemplary embodiment, the plastic shaft 580 and the plate member 590 are constructed of plastic and are integrally formed together utilizing the system 570 having an injection molding machine 572.

Referring to FIG. 23, a flowchart of a method for manufacturing the vehicular collision protection device 540 utilizing the system 570 in accordance with another exemplary embodiment will now be explained.

At step 600, the injection molding machine 572 injection molds the plastic shaft 580 having a first end portion 581 and a second end portion 582 and extending along a longitudinal axis 591. The plastic shaft 580 has a plurality of apertures that are spaced apart from one another. The first end portion 581 of the plastic shaft 580 is configured to be received in a portion of the vehicle hitch receiver 30. At least one of the plurality of apertures is configured to receive the locking pin 42 therethrough that removably couples the plastic shaft 580 to the vehicle hitch receiver 30.

At step 602, the injection molding machine 572 injection molds the plate member 590 that is integrally formed with the second end portion 582 of the plastic shaft 580. The plate member 590 has a groove 592 therein. When an amount of force applied to the plate member 590 in a direction aligned with the longitudinal axis 591 is greater than a threshold amount of force, a portion of the plastic shaft 580 between at least two of the plurality of apertures is configured to be sheared by the locking pin 42 to absorb at least a portion of the amount of force. It should be noted that the steps 600 and 602 can be performed substantially simultaneously within the injection molding machine 572.

The vehicular collision protection devices 40 and 540 and methods for manufacturing the device 40 provide a substantial advantage over merely using a vehicle bumper. In particular, the devices 40 and 540 provide a technical effect of utilizing a plastic shaft configured to be coupled to a vehicle hitch receiver to absorb at least a portion of an amount of force applied to the devices 40 and 540 by another vehicle and to decelerate the other vehicle in a safe manner.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention.

What is claimed is:

1. A vehicular collision protection device for coupling to a vehicle hitch receiver, comprising:
  a plastic shaft having a first end portion and a second end portion and extending along a longitudinal axis, the first end portion configured to be received in a portion of the vehicle hitch receiver, the plastic shaft having a plurality of apertures extending therethrough and spaced apart from one another, at least one of the plurality of apertures configured to receive a locking pin therethrough that removably couples the plastic shaft to the vehicle hitch receiver; and
  a plate member coupled to the second end portion of the plastic shaft, such that when an amount of force applied to the plate member in a direction aligned with the longitudinal axis is greater than a threshold amount of force, a portion of the plastic shaft between at least two of the plurality of apertures is configured to be sheared by the locking pin to absorb at least a portion of the amount of force.

2. The vehicle collision protection device of claim 1, wherein the plastic shaft is configured to have the locking pin shear portions of the plastic shaft between at least three of the plurality of apertures to absorb the amount of force applied to the plate member.

3. The vehicle collision protection device of claim 1, wherein the plastic shaft is constructed of an ultra high molecular weight polyethylene.

4. The vehicle collision protection device of claim 1, wherein the plastic shaft has a first side and a second side disposed opposite to the first side and generally parallel to the first side, the plurality of apertures extending between the first side and the second side and spaced apart from one another.

5. The vehicle collision protection device of claim 4, wherein the first side of the plastic shaft has a first groove extending into the first side that further extends along a first region encompassing ends of the plurality of apertures that are proximate to the first side.

6. The vehicle collision protection device of claim 5, wherein the plastic shaft has a third side and a fourth side disposed opposite to the third side and generally parallel to the third side, and a height of the first groove in a direction extending from the third side toward the fourth side is greater than a diameter of each of the plurality of apertures.

7. The vehicle collision protection device of claim 5, wherein a depth of the first groove increases along a direction from the first end portion toward the second end portion.

8. The vehicle collision protection device of claim 5, wherein a first depth of the first groove proximate to a first aperture of the plurality of apertures that is proximate to the first end portion is less than a second depth of the first groove proximate to a second aperture of the plurality of apertures that is proximate to the second end portion.

9. The vehicle collision protection device of claim 5, wherein the second side of the plastic shaft has a second groove extending into the second side that further extends along a second region encompassing ends of the plurality of apertures that are proximate to the second side.

10. The vehicle collision protection device of claim 4, wherein a distance from the first side of the plastic shaft to the second side of the plastic shaft is in a range of 1.8 inches to 2.2 inches.

11. The vehicle collision protection device of claim 10, wherein a diameter of each of the plurality of apertures is in a range of 0.6-0.65 inches.

12. The vehicle collision protection device of claim 10, wherein a distance between each of the apertures is in a range of 0.1-0.2 inches.

13. The vehicle collision protection device of claim 12, wherein a length of each of the plurality of apertures is in a range of 0.6-1.5 inches.

14. The vehicle collision protection device of claim 4, wherein a distance from the first side of the plastic shaft to the second side of the plastic shaft is in a range of 0.8 inches to 1.2 inches.

15. The vehicle collision protection device of claim 1, wherein the plastic shaft has a generally rectangular cross-sectional profile.

16. The vehicle collision protection device of claim 1, wherein the plurality of apertures comprises at least three apertures.

17. The vehicle collision protection device of claim 1, wherein the plurality of apertures comprises at least seven apertures.

* * * * *